(12) United States Patent
Levesque et al.

(10) Patent No.: US 10,756,821 B2
(45) Date of Patent: Aug. 25, 2020

(54) METHODS AND APPARATUS FOR IMPROVING RELIABILITY OF AN OPTICAL DEVICE USING AUXILIARY LASERS IN A PHOTONIC INTEGRATED CIRCUIT

(71) Applicant: Calix, Inc., San Jose, CA (US)

(72) Inventors: Gilbert Levesque, Palo Alto, CA (US); Nirmal S. Virdee, Peoria, AZ (US)

(73) Assignee: Calix, Inc., San Jose, CA (US)

(*) Notice: Subject to any disclaimer, the term of this patent is extended or adjusted under 35 U.S.C. 154(b) by 0 days.

(21) Appl. No.: 16/389,883

(22) Filed: Apr. 19, 2019

(65) Prior Publication Data
US 2019/0245625 A1 Aug. 8, 2019

Related U.S. Application Data

(62) Division of application No. 15/392,813, filed on Dec. 28, 2016, now Pat. No. 10,277,327.

(51) Int. Cl.
*H04B 10/572* (2013.01)
*H04Q 11/00* (2006.01)
*H04B 10/50* (2013.01)
*H04J 14/02* (2006.01)
*H04B 10/03* (2013.01)

(52) U.S. Cl.
CPC ........ *H04B 10/572* (2013.01); *H04B 10/03* (2013.01); *H04B 10/506* (2013.01); *H04J 14/0282* (2013.01); *H04J 14/0297* (2013.01); *H04Q 11/0005* (2013.01); *H04Q 2011/0016* (2013.01); *H04Q 2011/0018* (2013.01); *H04Q 2011/0043* (2013.01)

(58) Field of Classification Search
CPC . H04B 10/572; H04B 10/506; H04J 14/0282; H04J 14/0297; H04Q 11/0005; H04Q 2011/0016; H04Q 2011/0018; H04Q 2011/0043
See application file for complete search history.

(56) References Cited

U.S. PATENT DOCUMENTS

| | | | |
|---|---|---|---|
| 6,433,900 B1 * | 8/2002 | Kuroyanagi | H04J 14/0297 398/19 |
| 8,625,991 B1 * | 1/2014 | Sindhu | H04Q 11/0071 372/29.01 |
| 2001/0053015 A1 * | 12/2001 | Thomas | H04J 14/02 359/237 |

FOREIGN PATENT DOCUMENTS

GB 2311180 B * 3/2000 ........... H04L 49/255

* cited by examiner

*Primary Examiner* — Leslie C Pascal
(74) *Attorney, Agent, or Firm* — JW Law Group; James M. Wu (57) ABSTRACT

An optical device having a self-repair component capable of curing a defective component(s) is disclosed. To improve reliability as well as manufacturing yield, a photonic integrated circuit ("PIC") for as a multi-channel optical line terminal ("OLT") contains spare lasers or standby lasers configured to replace a failed laser(s). In one aspect, PIC includes a set of fixed-wavelength lasers ("FWLs"), a tunable-wavelength auxiliary laser ("TWAL"), a photonic detector, and a tuner. FWLs, for example, generate optical wavelengths representing optical signals. TWAL generates an optical signal with a spectrum of wavelengths based on a setting generated by the tuner. The photonic detector detects a defective wavelength. The tuner adjusts output wavelength of TWAL in response to the defective wavelength. Alternatively, PIC includes a working laser array, standby laser array, and spare laser array capable of providing two-layer laser defective protections.

18 Claims, 10 Drawing Sheets

METHODS AND APPARATUS FOR IMPROVING RELIABILITY OF AN OPTICAL DEVICE USING AUXILIARY LASERS IN A PHOTONIC INTEGRATED CIRCUIT

PRIORITY

This patent application is a divisional patent application of U.S. patent application Ser. No. 15/392,813, filed on Dec. 28, 2016, entitled "Method and Apparatus for Improving Reliability of An Optical Device Using Auxiliary Lasers in A Photonic Integrated Circuit" by Gilbert Levesque and Nirmal S. Virdee, which is issued as the U.S. Pat. No. 10,277,327 on Apr. 30, 2019, the disclosure of which is incorporated herein by reference.

RELATED APPLICATION

This application is related to the following co-pending application assigned to the Assignee of the present invention.

a. application Ser. No. 16/389,865, filed Apr. 19, 2019, entitled "Method and Apparatus for Improving Reliability of An Optical Device Using Auxiliary Lasers in A Photonic Integrated Circuit" by Gilbert Levesque and Nirmal S. Virdee, with an Attorney's docket No. 1153.P0001D1.

FIELD

The exemplary embodiment(s) of the present invention relates to network communication. More specifically, the exemplary embodiment(s) of the present invention relates to optical network using photonic integrated circuits ("PICs").

BACKGROUND

With high demand in high-speed and high-volume information transmission for both homes and institutions, the telecommunication industry has introduced more sophisticated optical devices to satisfy such demand. To continuously improve bandwidth and speed, a next-generation passive optical network 2 ("NGPON2") has been introduced recently as a new telecommunications network standard for a passive optical network ("PON"). A feature of NGPON2 is that it is able to operate within the existing PON (passive optical network) fiber structures. NGPON2, for example, operates at different wavelengths than the existing PON (i.e., GPON or XGPON). NGPON2 typically has its own associated optical line terminals ("OLTs") and optical network units ("ONUs") and operates alongside to other PON OLTs and ONUs. The signals from NGPON2 OLTs are multiplexed by wavelength multiplexer ("WM") before being combined with other signals using the Co-existence Element Optical communication networks typically offer high-speed voice, video, and data transmission to/from users and/or institutions. For example, PON generally includes fiber to the node/neighborhood ("FTTN"), fiber to the curb ("FTTC"), fiber to the building ("FTTB"), fiber to the home ("FTTH"), fiber to the premises ("FTTP"), or other edge location to which a fiber network extends. To transmit optical signals from a source to a destination over a PON, for example, the optical signals travel through multiple passive optical components such as fiber cables, optical splitters and attenuators that make up the optical distribution network ("ODN").

NGPON2 generally employs a range of wavelength division multiplexed ("WDM") channels/wavelengths to operate within the time and wavelength division multiplexed ("TWDM") PON environment. For example, a conventional NGPON2 can have up to eight (8) WDM channels which carry a set of discreet wavelengths generated by multiple optical transceivers or lasers. The set of discreet wavelengths are usually multiplexed onto a single fiber (i.e., SSMF—Single, Single Mode Fiber). To reduce the complexity and cost associated with the discreet implementation, a photonic integrated circuit ("PIC") technology has been developed. For example, multiple channels can be integrated into a single PIC.

A problem, however, associated with a conventional PIC is that manufacturing yield for producing such PICs can be low. For example, a PIC is typically discarded when one of the channels or lasers is defective thereby the failure generally renders the entire device or PIC useless. Another problem associated with conventional PIC is that a good PIC device deployed in the field may stop functioning when one of the channels or lasers within PIC stops working. For example, if a channel in a PIC fails or degrades, the entire PIC device has to be replaced and discarded.

A conventional approach to mitigate a channel failure within an optical device is to switch device port(s) from a port connected to a failed channel to another port connected to a working channel. A drawback associated with port switching is that it negatively impacts resources since each device has limited number of ports. Another drawback associated with the port switching is that it adds additional traffic to a working port while the port connected to a bad laser is, for example, is in a failed state. If a port has multiple channels, to replace the device on the port, all channels have to be switched including the working one(s) to other channels.

SUMMARY

The present invention discloses a method and apparatus configured to use a self-repair component to improve reliability as well as manufacturing yield for a photonic integrated circuit ("PIC"). A PIC, for a multi-channel optical line terminal ("OLT"), contains spare lasers configured to facilitate replacing a failed laser(s). In one aspect, PIC, operable to emit optical signals or channels, includes a set of fixed-wavelength lasers ("FWLs"), a tunable-wavelength auxiliary laser ("TWAL"), a photonic detector per laser, and a tuner. FWLs, for example, are configured to generate a set of optical wavelengths representing a first set of optical signals. TWAL is able to generate an optical signal with a spectrum of wavelengths based on a setting generated by the tuner. The photonic detector is capable of detecting a defective wavelength associated with a particular FWL. The tuner is able to adjust the output wavelength of TWAL in response to the defective wavelength.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Exemplary embodiment(s) of the present invention is described herein in the context of a method, device, and apparatus of generating optical signals using auxiliary lasers to improve PIC reliability as well as PIC production yield.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. It, however, will be understood that such a development effort might be complex and time-consuming, but would nevertheless be a routine undertaking of engineering for those of ordinary skills in the art having the benefit of embodiment(s) of this disclosure.

Unless otherwise defined, all terms (including technical and scientific terms) used herein have the same meaning as commonly understood by one of ordinary skills in the art to which the exemplary embodiment(s) belongs. It will be further understood that terms, such as those defined in commonly used dictionaries, should be interpreted as having a meaning that is consistent with their meaning in the context of the relevant art and this exemplary embodiment(s) of the disclosure unless otherwise defined.

One embodiment of the present invention discloses an optical device such as a photonic integrated circuit ("PIC") includes a self-repair component capable of curing a defective component(s). To improve reliability as well as manufacturing yield, a PIC for a multi-channel OLT, contains spare lasers configured to facilitate replacing a failed laser(s). In one aspect, PIC, operable to emit optical signals or channels, includes a set of fixed-wavelength lasers ("FWLs"), a tunable-wavelength auxiliary laser ("TWAL"), a photonic detector per laser, and a tuner. FWLs, for example, are configured to generate a set of optical wavelengths representing a first set of optical signals. TWAL is able to generate an optical signal with a spectrum of wavelengths based on a setting generated by the tuner. The photonic detector is capable of detecting a defective wavelength associated with a particular FWL. The tuner is able to adjust the output wavelength of TWAL in response to the defective wavelength.

Figure 1A:
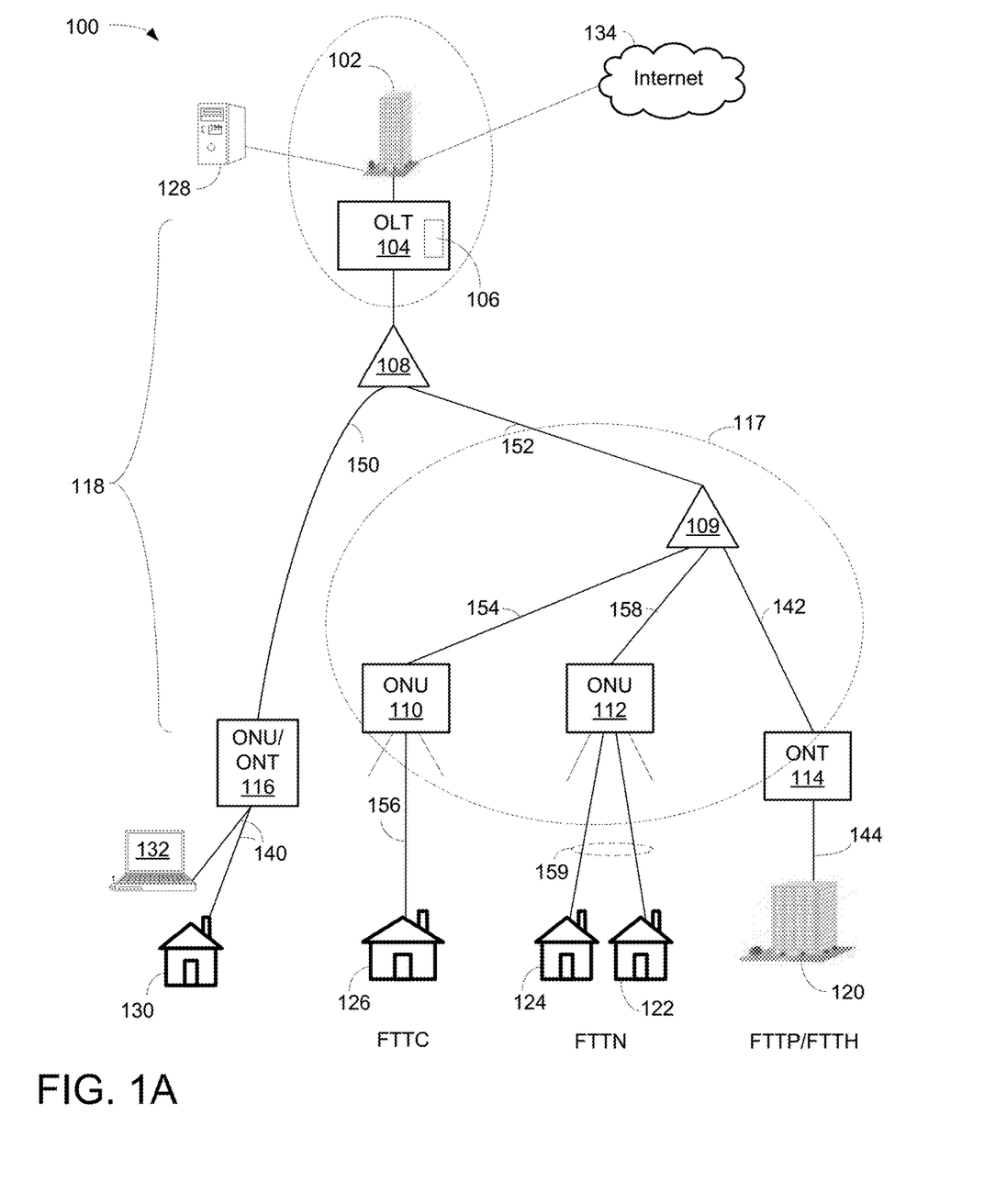
FIGS. 1A-B are block diagrams illustrating network configurations having an optical device with a repair component in accordance with one embodiment of the present invention.

FIG. 1A is a block diagram 100 illustrating a network configuration having an optical device with a repair component 106 in accordance with one embodiment of the present invention. Diagram 100 includes a central office ("CO") 102, OLT 104, building 120, premises (or neighborhood) 122-130, user 132, and optical distribution network ("ODN") 118. Optical network 118, in one example, includes PON 117. User 132, in one example, includes one or more personal devices such as laptop computer(s), smartphone(s), base station(s), and/or tablet(s). It should be noted that the underlying concept of the exemplary embodiment(s) of the present invention would not change if one or more devices (or components) were added to or removed from diagram 100.

PON 117, or legacy PON, includes splitter 109 and ONUs 110-114. FTTC, in one example, means coupling OLT 104 to premise 126 such as a house via fiber splitters 108-109, ONU 110, and connections 152-156. FTTN is defined connecting OLT 104 to neighborhoods 122-124 via a network path including fiber splitters 108-109, ONU 112, and connections 152 and 158-159. Also, FTTP or FTTH indicates that a network coupling between OLT 104 and building 120 via fiber splitters 108-109, ONT 114 (optical network terminal), and connections 152 and 142-144.

Fiber splitter 108, in one example, facilitates an optical connection between OLT 104 and ONU 116. ONU 116 can also be configured to provide network services to user 132 and/or neighborhood 130 via connections 140. It should be noted that OLT 104 can be situated in CO 102.

CO 102, in addition to couple to OLT 104, is also coupled to server 128 and Internet 134. CO 102 can also be a network management system ("NMS") capable of maintaining and monitoring communications between various network devices. For example, CO 102 provides functions for controlling, planning, allocating, deploying, coordinating, and monitoring the resources of a network, including performing functions, such as fault management, configuration management, accounting management, performance management, and security management ("FCAPS"). The fault management is able to identify, correct and store faults that occur in an optical network.

Each ODN, in one example, provides optical data transmission between one (1) OLT and a group of ONTs. OLT 104, ONU 110-112, and ONT 114-116, for example, convert user data between electrical signals and optical signals to facilitate data traveling over ODN. PON or NGPON2 is capable of serving multiple points or premises based on a single optical fiber. For example, NGPON2 or PON may be able to individually distribute information from one optical fiber to multiple locations.

Repair component 106, in one embodiment, includes auxiliary lasers, detector, and routing element(s). Component 106 can also be referred to as automatic self-repairing element capable of using prefabricated auxiliary spare parts to repair a limited number of defective parts during the operation of PIC as well as improving manufacturing yield. For example, upon detecting a defective laser by the detector, one of the auxiliary lasers is activated to replace the defective laser. After tuning the output wavelength of auxiliary laser to the same or similar to the output wavelength of the defective laser, the output of defective laser is replaced by the output of the auxiliary laser. In one aspect, the detector continuously monitors all working lasers and detects any potential defective laser(s). If an auxiliary tunable laser is defective, repair component 106 can logically remove the defective auxiliary laser from the spare laser list. In one embodiment, a PIC containing OLT 104 can repair a defective laser as long as a spare laser is available.

An advantage of using a PIC with a repair component is that it improves reliability of PIC as well as overall PIC manufacturing yield.

Figure 1B:
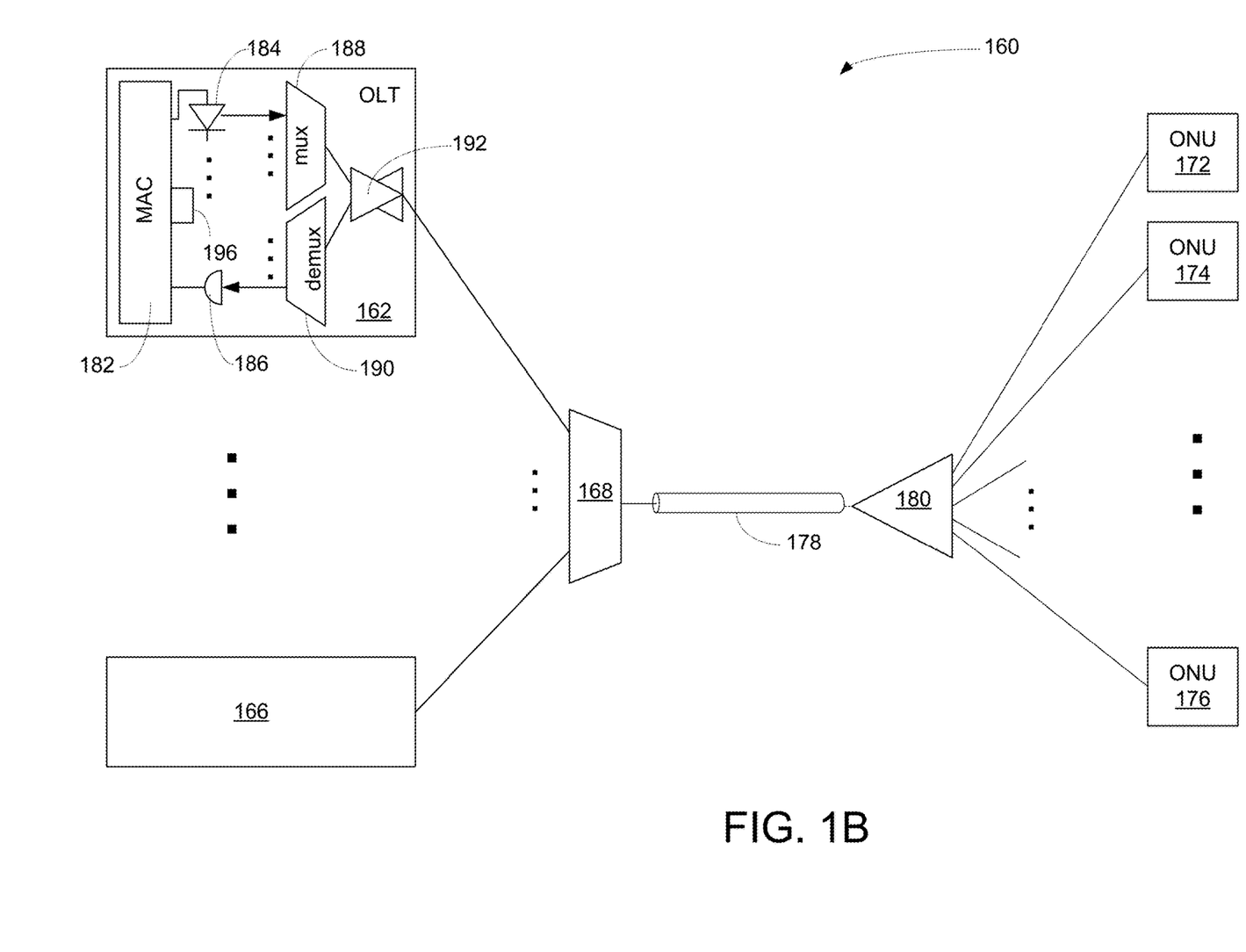

FIG. 1B is a block diagram 160 illustrating an optical network configuration including optical devices with repair component(s) in accordance with one embodiment of the present invention. Diagram 160 illustrates a NGPON2 system which includes OLT 162, multiple ONUs 172-176, and fiber 178. NGPON2 system, in one embodiment, is NGPON2 containing a mux 168 and splitter 180 used for coupling OLT 162 with ONU 172-176. It should be noted that the underlying concept of the exemplary embodiment(s) of the present invention would not change if one or more blocks (or devices) were added to or removed from diagram 160.

OLT 162 includes a media access control ("MAC") component 182, a set of lasers 184, a set of optical receivers 186, mux 188, demux 190, optical amplifier 192, and repair component 196. In one example, OLT 162 includes a stack of four lasers used for emitting or generating optical signals wherein each laser generates a unique set of frequency and/or wavelength. In one aspect, lasers 184 are fixed lasers wherein each laser generates a unique wavelength representing a set of data. Alternatively, lasers 184, in addition to the fixed lasers, can also have tunable lasers or laser diodes capable of emitting optical data based on parameters set by a tuner.

ONUs 172-176 include either fixed or tunable transmitters (i.e., lasers) and/or receivers (i.e., photo diodes or diodes) for receiving optical data from mux 188. The tunable transmitter is capable of tuning its output wavelength to a specific wavelength. To generate proper optical light beam with sufficient power, OAs 192 are used for boosting downstream signals. OAs 192 also amplifies upstream optical signals before sending the signals to the optical receivers. Coexistence element mux ("CEM") 168, in one example, is used to multiplex OLT output onto a single fiber 178 using multiple channels. Splitter 180 is placed at the other end of fiber 178. Upon receipt of optical signals, splitter 180 distributes optical signals to various ONUs 172-176.

CEM 168, in one example, is coupled to other optical network devices such as device 166. Device 166 can be other types of OLTs or elements, such as GPON OLT, XG-PON OLT, OTDR (optical time-domain reflectometer), and the like.

Repair component 196, in one embodiment, includes a set of auxiliary or spare lasers, detector, tuner, and optical switch. While auxiliary lasers can be used to replace defective lasers, detector is used to detect or sense which laser is defective. Tuner is used to tune auxiliary laser's output wavelength so that the output of auxiliary laser matches with the output of the defective laser whereby the defective laser can be logically replaced by an auxiliary laser. A function of optical switch or optical router is to substitute output wavelength of a defective laser with output wavelength of an auxiliary laser. In an alternative embodiment, repair component 196 further includes a set of spare diodes used for replace defective diodes as receivers.

To simply forgoing discussion, the spare or auxiliary laser as transmitter will be discussed in detail while spare diodes as receivers will be omitted. It should be noted that the concept of repairing process for a defective diode is similar to the process of replacing a defective laser.

Figure 2:
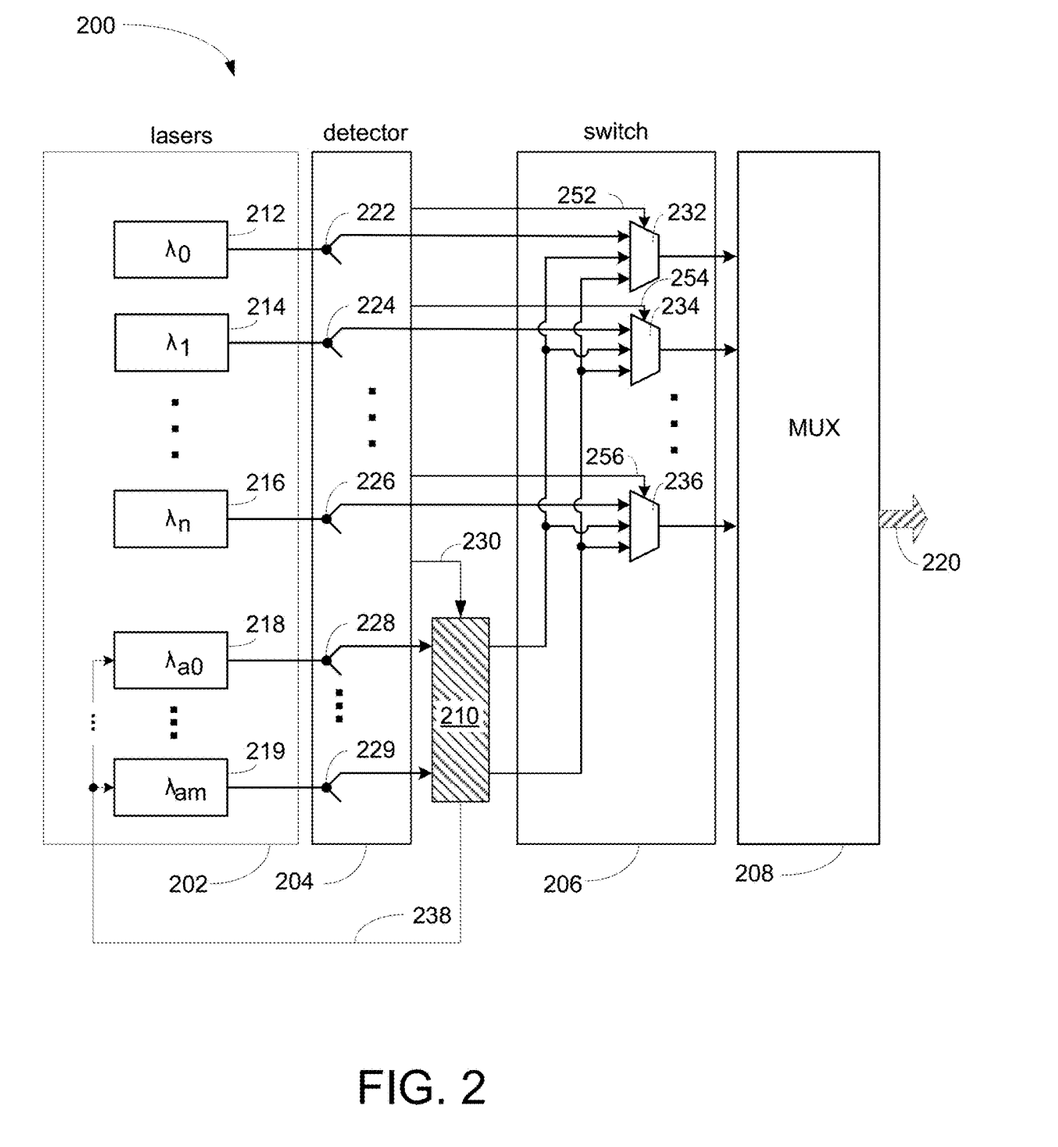
FIG. 2 is a block diagram illustrating an optical device capable of repairing defective laser(s) using an auxiliary laser(s) in accordance with one embodiment of the present invention.

FIG. 2 is a block diagram 200 illustrating an optical device or PIC capable of repairing defective laser(s) using an auxiliary laser(s) in accordance with one embodiment of the present invention. Diagram 200 includes an optical device containing a laser array 202, detector 204, switch 206, and tuner 210. In one aspect, the optical device, which can be a PIC including an OLT, is configured to use onboard spare or auxiliary parts for self-repairing any defective part(s). The PIC can also include a mux or WDM mux used for multiplexing multiple optical wavelengths onto a single optical fiber via multiple channels. It should be noted that the underlying concept of the exemplary embodiment(s) of the present invention would not change if one or more blocks (or devices) were added to or removed from diagram 200.

Laser array 202, in one embodiment, includes a set of fixed-wavelength lasers ("FWLs") 212-216 configured to generate a set of optical wavelengths representing a set of optical signals. FWLs 212-216 can also be referred to as $\lambda 0$-$\lambda n$ where n is an integer indicating number of lasers or laser diodes. For example, FWLs 212-216 includes four (4) lasers wherein four (4) lasers are configured to generate four (4) unique wavelengths representing four unique sets of optical data. Note that each laser such as $\lambda 0$ emits a unique wavelength representing a stream of optical signals. In an alternative embodiment, FWLs 212-216 can be replaced with tunable lasers wherein each laser such as $\lambda 1$ can be calibrated or tuned into a user fined wavelength and/or frequency. For example, $\lambda 1$ can generate a spectrum of wavelength from, for example, blue color to red color. While output wavelengths of FWLs 212-216 are forwarded to detector 204 as shown in diagram 200, the outputs of FWLs 212-216 can also be forwarded to any other blocks such as switch 206 or mux 208 depending on the applications.

Laser array 202, in one aspect, further includes a set of tunable-wavelength auxiliary lasers ("TWALs") 218-219 which are also known as $\lambda a 0$-$\lambda am$ where m is an integer indicating number of spare lasers and the letter "a" indicating the laser is an auxiliary or spare laser. TWALs 218-219 can have any number of spare lasers. For example, TWALs can have a range from two (2) to sixteen (16) tunable lasers for generating optical signals having wavelengths based on wavelength setting signals. For example, a TWAL such as $\lambda a 0$ is a light emitter operable to generate one of a range of wavelengths according to a wavelength setting signal generated by tuner 210 via connection 238.

Photonic detector or detector 204, in one embodiment, includes a set of monitoring elements 222-229 configured to detect potentially defective optical beams generated by any of FWLs 212-216 and TWALs 218-219. For example, detector 204 is able to detect a defective wavelength associate to one of FWLs 212-216 or TWALs 218-219. In one aspect, detector 204 includes multiple splitters and/or light sensors capable of detecting failures associated with optical signals or light streams generated by any of FWLs 212-216 or TWALs 218-219. It should be noted that any types of optical light sensors, including back facet monitors, may be used for detecting defective lasers as long as the sensors do not substantially degrade the optical outputs.

Tuner 210, in one embodiment, is used to adjust output wavelength of TWALs 218-219 according to defective wavelength generated by a defective laser or FWL such as FWL 212. Tuner 210, for example, is able to identify defective frequency or wavelength associated to a defective laser and subsequently adjusts a TWAL to generate the same or similar wavelength as the defective wavelength.

Optical switch or switch 206 which is coupled to FWLs 212-216 and TWALs 218-219 replaces a defective laser(s) from FWLs 212-216 in accordance with the defective wavelength indication(s). In one example, optical switch 206 is operable to switch off a defective laser in response to a defective signal from the detector as indicated by numeral 252. Mux or multiplexer 208, coupled to switch 206 or laser array 202, is used to transform multiple output wavelengths generated by FWLs 212-216 into wavelength division multiplexing ("WDM") signals whereby WDM signals 220 can be transmitted via multiple channels over an optical fiber.

In an alternative embodiment, laser array 202 includes a second set of FWLs which can be used as a set of standby lasers capable of being activated to replacing FWLs. For example, the second set of FWLs is able to generate a second set of optical wavelengths representing a second set of optical signals. An advantage of employing a second set of FWLs is that the second set of FWLs can be the first repair option to replace the active set of defective FWLs. TWALs 218-219, in this embodiment, are the second repair option to replace the active set of defective FWLs.

In one embodiment, a multi-channel PIC device with M:N (M for N) redundancy can be employed, where M and N are integers. For example, an 8-channel OLT PIC device may include 8+M (redundant) lasers fabricated onto the PIC device wherein the best eight (8) are bonded out to improve manufacturing yield. It should be noted that 8 lasers plus M number of redundant lasers are an exemplary configuration. Other numbers of lasers plus redundant can be used as well. To provide protection against in-field failures, 8+M (redundant) lasers and an optical selection mechanism can also be fabricated in the device such that the redundant laser(s) can substitute for any failed laser(s). In one aspect, the M (redundant) lasers can be tunable to make the protection mechanism simpler and/or robust. Alternatively, a combination of fixed wavelength lasers and M (redundant) tunable lasers may be used. In one example, a one-to-one (1:1) protection could be used by having a working laser array and a standby laser array.

During operation, when a laser, for example, fails in a working array, the defective laser can be replaced by a laser from the standby array or the whole working array may be replaced by the standby array. An advantage of using a laser array containing an automatic self-repairing component is that the automatic self-repairing component enhances reliability of PIC because if one of the lasers fails while carrying NGPON2 traffic, the traffic will be switch to a spare or auxiliary laser.

Figure 3A:
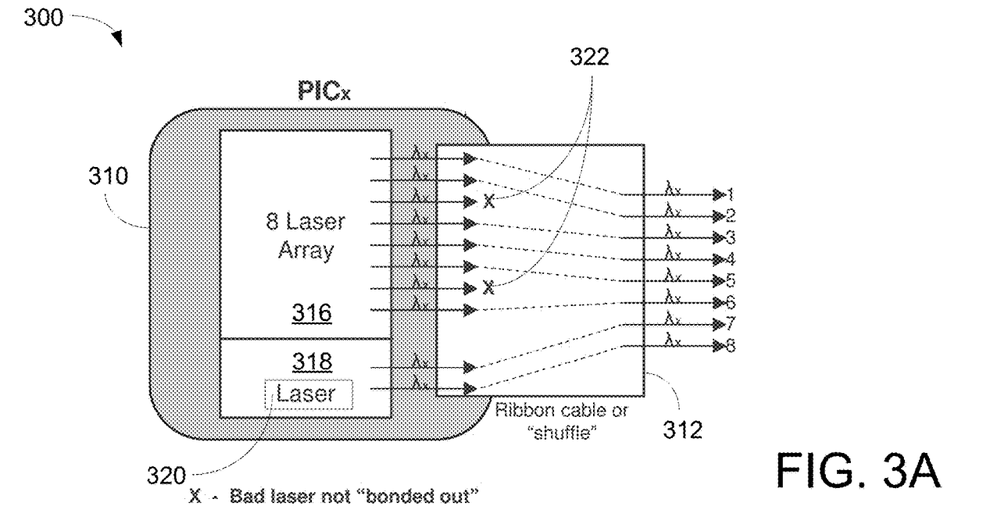
FIGS. 3A-C are block diagrams illustrating photonic integrated circuits ("PICs") containing auxiliary lasers in accordance with embodiments of the present invention.

FIG. 3A is a block diagram 300 illustrating a photonic integrated circuit ("PIC") containing auxiliary lasers in accordance with one embodiment of the present invention. Diagram 300 includes PIC 310 and optical shuffle 312, wherein PIC 310 further includes laser array 316 and repair component 318. In one embodiment, repair component 318 further includes spare lasers 320. A benefit of having repair component 318 is to improve manufacturing yield. It should be noted that the underlying concept of the exemplary embodiment(s) of the present invention would not change if one or more blocks (or devices) were added to or removed from diagram 300.

Repair component 318, in one embodiment, includes a group of fixed or tunable auxiliary lasers 320 which may be used to substitute one or more defective lasers in laser array 316. Repair component 318, in one aspect, further includes a detector and a tuner, not shown in FIG. 3A, for facilitating automatic self-repairing. Upon detecting a defective light beam, a defective laser within laser array 316 is identified based on the wavelength of defective light beam since each light beam has a unique wavelength. Based on the defective light beam, tuner is able to tune one of spare lasers to produce the same wavelength as the defective laser.

To simplify the connections, a sorting device such as fiber shuffle 312 is used for fiber cabling and/or connecting. Fiber shuffler 312, in one embodiment, receives output wavelengths κx and routing working wavelengths κx to the output ports of shuffle. In one example, fiber shuffle 312, also known as ribbon cable, is coupled to PIC 310 and facilitates internal routing to output a predefined number of working output while suppressing defective lasers or wavelengths such as wavelengths indicated by numeral 322. A function of shuffle 312 is to prevent defective or bad output from bad or defective laser from bonding out of PIC.

PIC 310, in one example, contains an M for N (M:N) bond out protection, wherein M and N are integers. For instance, PIC 310 having an (8:2) (i.e., N=8 and M=2) protection includes eight (8) fixed lasers in laser array 316 and two (2) fixed or tunable spare lasers in auxiliary lasers 320. In one embodiment, all lasers in PIC 310 are the same wavelength ("WL"). Note that N+M fixed lasers are easier to fabricate. An optical device requires N different WL PICs for a WDM system. Ribbon or shuffle 312 is configured to select (bond out) N good lasers.

An advantage of employing PIC 310 with repair component 318 is to improve overall PIC manufacturing or production yield.

Figure 3B:
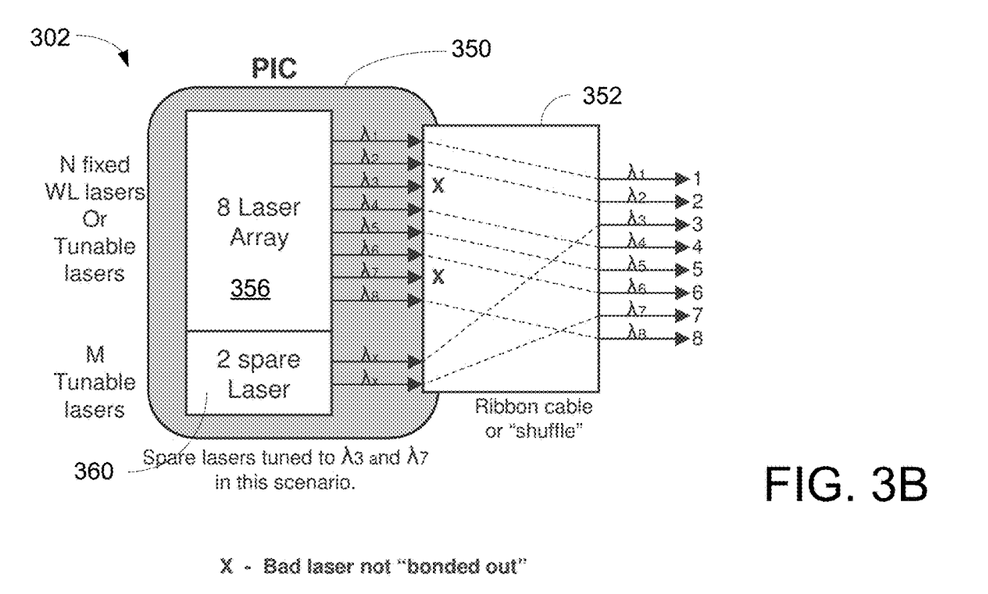

FIG. 3B is a block diagram 302 illustrating photonic integrated circuits ("PIC") containing tunable auxiliary lasers for automatic repairing in accordance with one embodiment of the present invention. Diagram 302 includes PIC 350 and optical shuffle 352 wherein PIC 350 further includes N fixed WL laser 356 and M tunable WL spare lasers 360, where N and M are integers. In an alternative embodiment, laser 356 can also be tunable lasers. It should be noted that the underlying concept of the exemplary embodiment(s) of the present invention would not change if one or more blocks (or devices) were added to or removed from diagram 302.

In one aspect, PIC 350 includes an M:N protection for "bonding" options. For example, if N=8 and M=2, PIC 350 includes eight (8) fixed or tunable WL lasers in laser array 356 and two (2) tunable lasers in spare lasers 360. In one example, PIC 350 is a colored PIC wherein PIC is able to generate N different wavelengths (WLs) where N lasers can be fixed at λ1 to λ8 or tunable over the channel range. M spare (or protection) lasers 360 are tunable so that a spare laser can be routed to replace one of the defective lasers in laser array 356. Ribbon or shuffle 352 is configured to select (bond out) N good lasers with spare lasers properly tuned to replace the failed channel lasers. PIC 350, in one example, can be used in "discrete" or "integrated" WDM network configurations.

An advantage of using PIC 350 with M:N protection is to improve manufacturing yield of PIC.

Figure 3C:
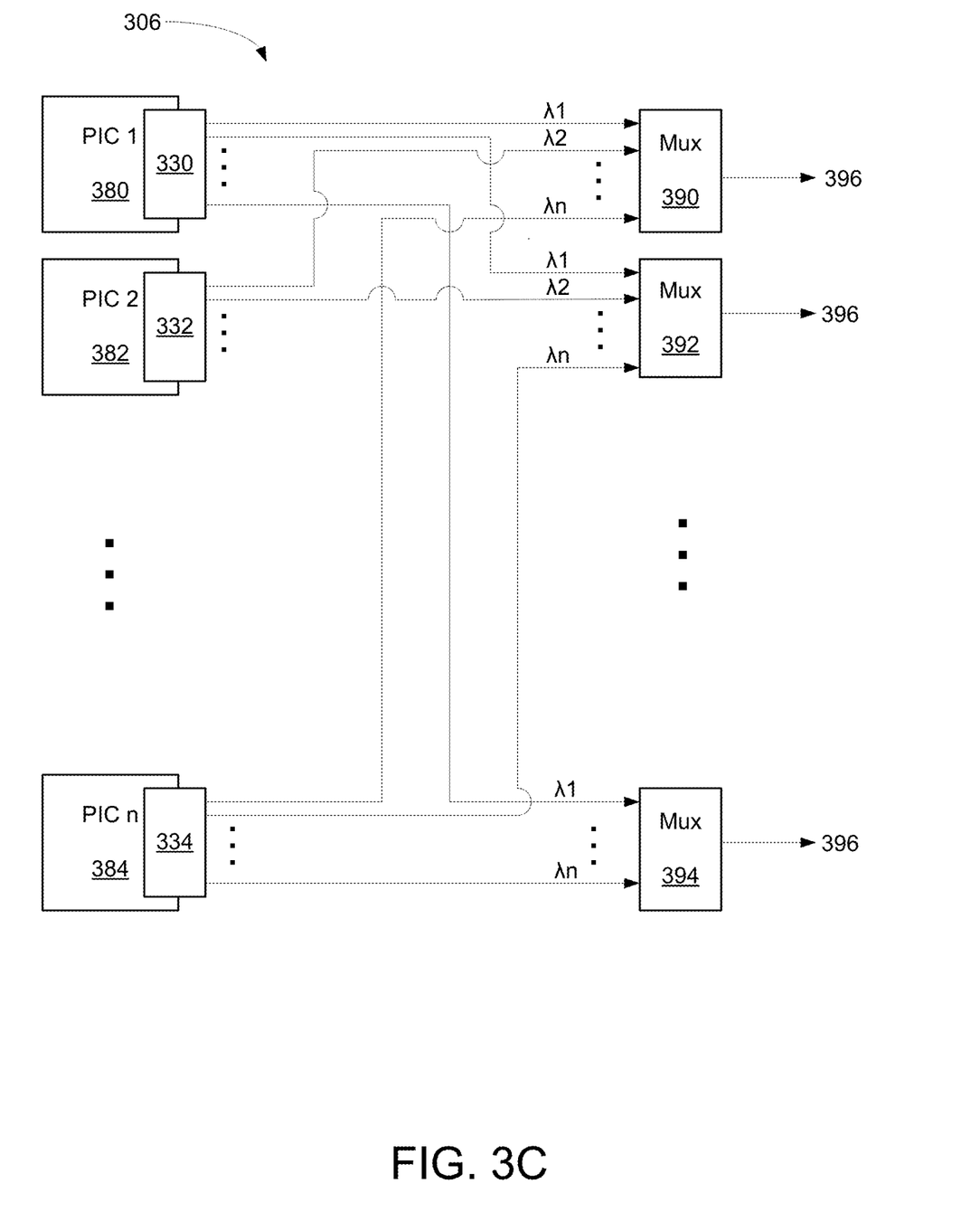

FIG. 3C is a block diagram 306 illustrating an optical device having a cluster of PICs capable of substituting defective lasers with spare lasers in accordance with one embodiment of the present invention. Diagram 306 includes a group of PICs 380-384, optical shuffles 330-334, and muxes 390-394. In one aspect, each PIC such as PIC 1 is the same or similar to PIC 310 shown in FIG. 3A capable of producing or bonding out a set of working WL while defective WLs are suppressed or replaced. Defective WLs indicate wavelengths generated by defective lasers, and spare WLs indicate wavelengths generated by spare working lasers. Alternatively, each PIC shown in diagram 306 such as PIC 1 is the same or similar to PIC 350 shown in FIG. 3B capable of being configured to replace output wavelength of a defective laser with output wavelength of a spare laser.

In one aspect, each PIC such as PIC 380 is configured to generate a set of same fixed WLs. For example, PIC 1 380 is able to emit eight (8) red lights or optical beams with the same WL such as λ1. PIC 2 382 emits eight (8) green lights or optical beams with the same WL such as λ2. With use of various shuffles or sorting device(s), each mux such as mux 390 is able to receive n number of different optical beams with n number of different WLs such as from λ1, λ2 ... λn. A function of mux such as mux 390 is able to multiplex WLs such as λ1, λ2 ... λn onto a single fiber such as fiber 396 using multiple channels.

To repair defective lasers during PIC fabrication, a set of shuffles 330-334 are used to replace defective lasers with spare or auxiliary lasers. In operation, upon fabrication of a batch of PICs, each PIC is tested to ascertain the functionality of each PIC. After identifying one or more defective lasers, one or more spare or auxiliary lasers are used to replace the defective lasers via shuffle(s). Note that defective lasers or diodes can be replaced as long as the spare lasers or diodes are available.

An advantage of using the PICs with repair capability is that it enhances overall PIC manufacturing yield.

Figure 4A:
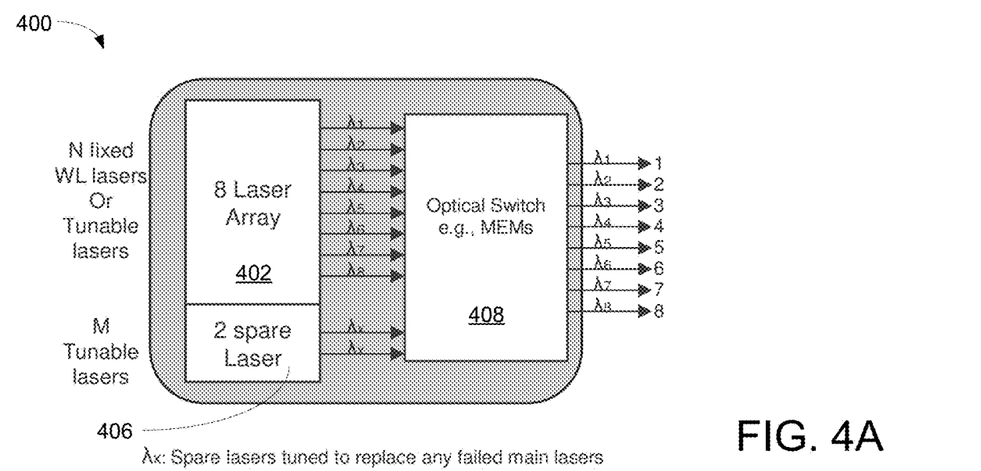
FIGS. 4A-B are logic diagrams illustrating PICs having switching fabric or multiplexing fabric for repairing defective parts in accordance with embodiments of the present invention.

FIG. 4A is a logic diagram illustrating PIC 400 having switching fabric for repairing defective parts in accordance with one embodiment of the present invention. PIC 400 includes a set of eight (8) lasers 402, two (2) spare lasers 406, and optical switch 408, wherein optical switch 408 can be fabricated using MEMS (micro-electro mechanical systems) technology. Eight (8) lasers 402 and two (2) spare lasers 406 are an exemplarily configuration and PIC 400 can have any number of lasers 402 with any number of spare lasers to form M:N protection where M is a number of spare lasers while N is a number of working lasers. It should be noted that the underlying concept of the exemplary embodiment(s) of the present invention would not change if one or more blocks (or devices) were added to or removed from PIC 400.

M is the number of failures or defects that PIC 400 can repair wherein the defective parts could occur during a manufacturing process and/or in-service breakdown through normal wear and tear. PIC 400, also known as color PIC with optical switch, can be configured to have eight (8) fixed WL lasers 402 and two (2) tunable lasers 406. Eight (8) lasers 402 generate a set of fixed WL from λ1 to λ8 (or tunable over the channel range). Two (2) spare (or auxiliary) lasers 406 are tunable capable of tuning their output WLs to any of the λ1 through λ8. Optical switch 408, in one aspect, is integrated in PIC 400 to replace "bad" main lasers with "spare" lasers which are tuned to defective WLs produced by failed channel lasers. The eight (8) output WLs λ1 to λ8 from optical switch 408 are the output WLs of PIC 400. PIC 400 can be used in "discrete" or "integrated" WDM network configurations.

An advantage of using PIC 400 is that it can help improve manufacturing yield as well as in-field failures recovery.

Figure 4B:
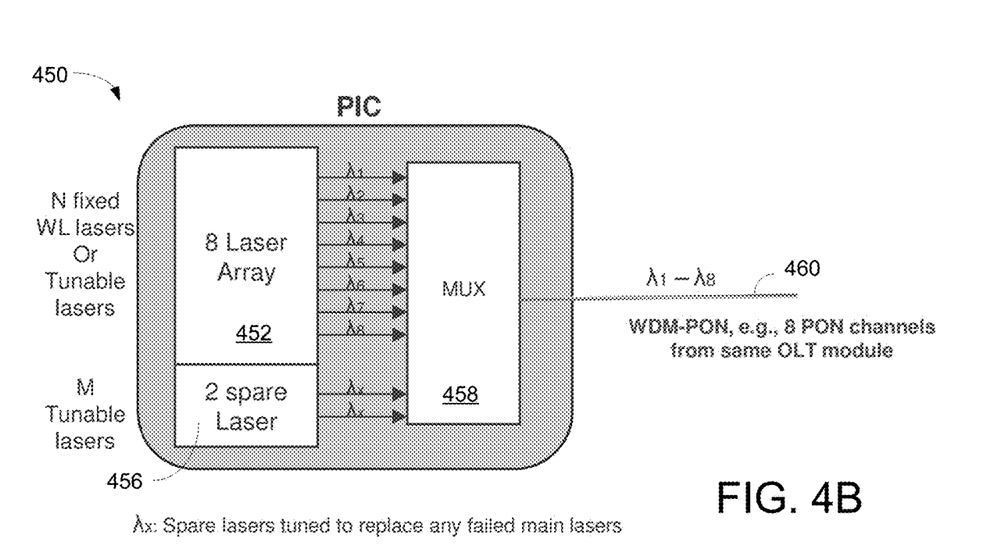

FIG. 4B is a logic diagram illustrating PIC 450 capable of repairing defective parts in accordance with one embodiment of the present invention. PIC 450 includes a set of eight (8) lasers 452, two (2) spare lasers 456, and mux 458. Note that eight (8) lasers 452 and two (2) spare lasers 456 are an exemplarily configuration and PIC 450 can have any number of lasers 452 with any number of spare lasers forming M:N protection where M is number of spare lasers while N is number of working lasers. It should be noted that the underlying concept of the exemplary embodiment(s) of the present invention would not change if one or more blocks (or devices) were added to or removed from PIC 450.

In one embodiment, M is the number of failures that PIC 400 can protect against failures or defects from a manufacturing process and/or in-service breakdown. PIC 450, also known as color PIC with mux, can be configured to have eight (8) fixed WL lasers 452 and two (2) tunable lasers 456. Eight (8) lasers 452 are fixed at λ1 to λ8 (or tunable over the channel range). Two (2) spare (or auxiliary) lasers 456 are tunable capable of tuning their output WLs to any of the λ1 to λ8. Mux 458, in one aspect, is integrated in PIC 400 to replace "bad" main lasers with "spare" lasers which are tuned to replace failed channel lasers. For example, a bad laser may be turned off while a spare laser is tuned to the channel originally used by the bad laser. The eight (8) output WLs λ1 to λ8 from PIC 450 are multiplexed onto a single fiber coupled to, for example, eight (8) PON channels via WDM-PON. PIC 400 can be used in "integrated" WDM network configurations.

An advantage of using PIC 450 is that it can help improve manufacturing yield as well as in-field failures recovery.

Figure 5A:
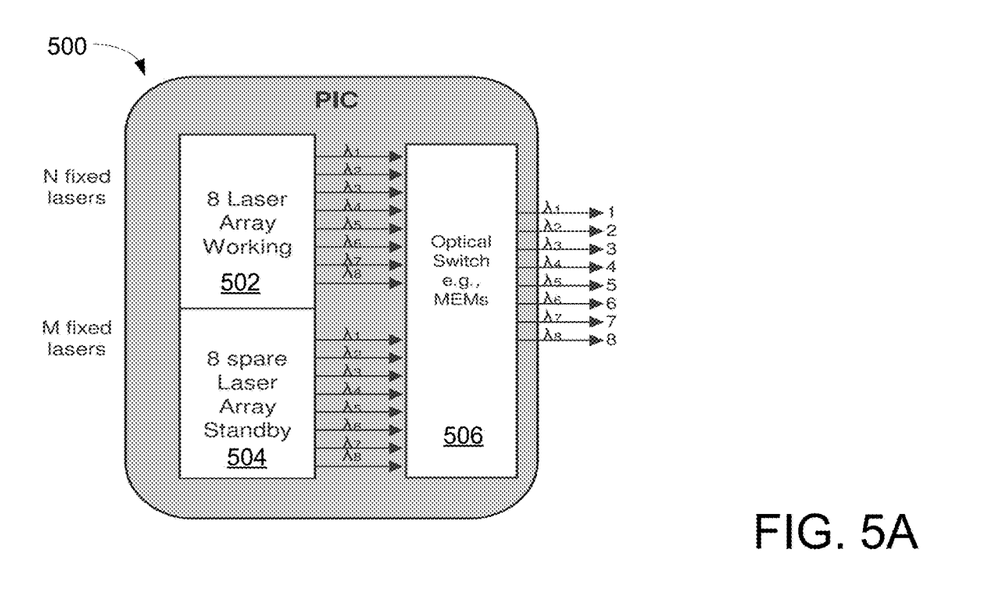
FIGS. 5A-B are block diagrams illustrating PICs having an alternative protection configuration using standby lasers in accordance with embodiments of the present invention.

FIG. 5A is a block diagram illustrating a PIC 500 having an alternative protection configuration using standby lasers in accordance with one embodiment of the present invention. PIC 500, in one embodiment, includes a set of eight (8) lasers 502, eight (8) spare lasers 504, and optical switch 506, wherein optical switch 506 can be fabricated using MEMS (micro-electro mechanical systems) technology. Note that eight (8) lasers 502 or 504 are an exemplarily configuration wherein PIC 500 can have any number of lasers 502 with any number of spare lasers. It should be noted that the underlying concept of the exemplary embodiment(s) of the present invention would not change if one or more blocks (or devices) were added to or removed from PIC 500.

In one embodiment, PIC 500 is one-to-one (1:1) colored PIC with optical switch 506. Working laser array 502 includes eight (8) lasers capable of providing fixed WL from λ1 to λ8. Auxiliary laser array 504, also known as M spare or protection lasers, includes eight (8) standby lasers capable of providing a set of fixed WL from λ1 to λ8. Optical switch 506, in one embodiment, is integrated on PIC 500 and is capable of replacing "bad" working lasers with "spare" lasers. Alternatively, whole working laser array 502 can be replaced with the standby laser array 504. The eight (8) output WLs λ1 to λ8 from optical switch 506 are the output WLs of PIC 500. PIC 500 can be used in "discrete" or "integrated" WDM network configurations.

An advantage of using PIC 500 is that it can help improve manufacturing yield as well as in-field failures recovery.

Figure 5B:
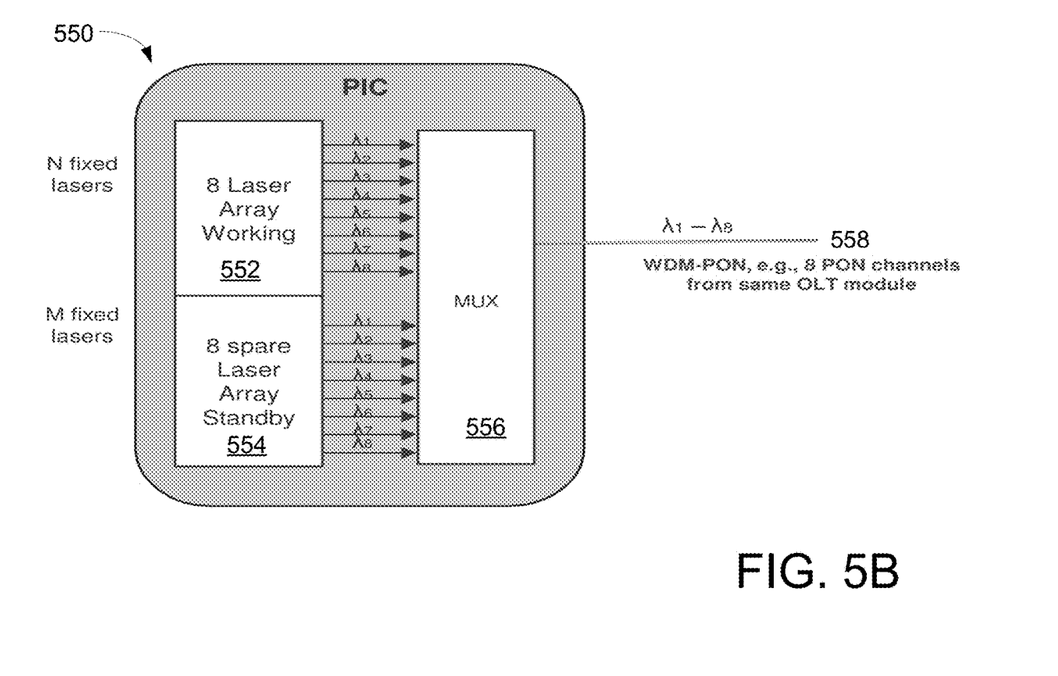

FIG. 5B is a block diagram illustrating a PIC 550 having an alternative protection configuration using standby lasers in accordance with one embodiment of the present invention. PIC 550, in one embodiment, includes a set of eight (8) lasers 552, eight (8) spare lasers 554, and mux 556, wherein mux 556 is in general less sophisticated than an optical switch as illustrated in FIG. 5A. Note that eight (8) lasers 552 or 554 are an exemplarily configuration wherein PIC 550 can have any number of lasers 552 as well as spare lasers 554. It should be noted that the underlying concept of the exemplary embodiment(s) of the present invention would not change if one or more blocks (or devices) were added to or removed from PIC 550.

In one embodiment, PIC 550 is one-to-one (1:1) colored PIC with mux 556. Working laser array 552 includes eight (8) lasers capable of providing fixed WL from $\lambda 1$ to $\lambda 8$. Auxiliary laser array 554, also known as M spare or protection lasers, includes eight (8) standby lasers capable of providing a set of fixed WL from $\lambda 1$ to $\lambda 8$. Optical mux 556, in one embodiment, is integrated on PIC 550 and is capable of replacing "bad" working lasers with "spare" lasers. Alternatively, whole working laser array 552 can be replaced with the standby laser array 554. The eight (8) output WLs $\lambda 1$ to $\lambda 8$ from PIC 550 are multiplexed onto a single fiber 558 coupled to, for example, eight (8) PON channels via WDM-PON. PIC 550 can be used in "integrated" WDM network configurations An advantage of using PIC 550 is that it can help improve overall PIC manufacturing yield as well as in-field failures recovery.

Figure 6A:
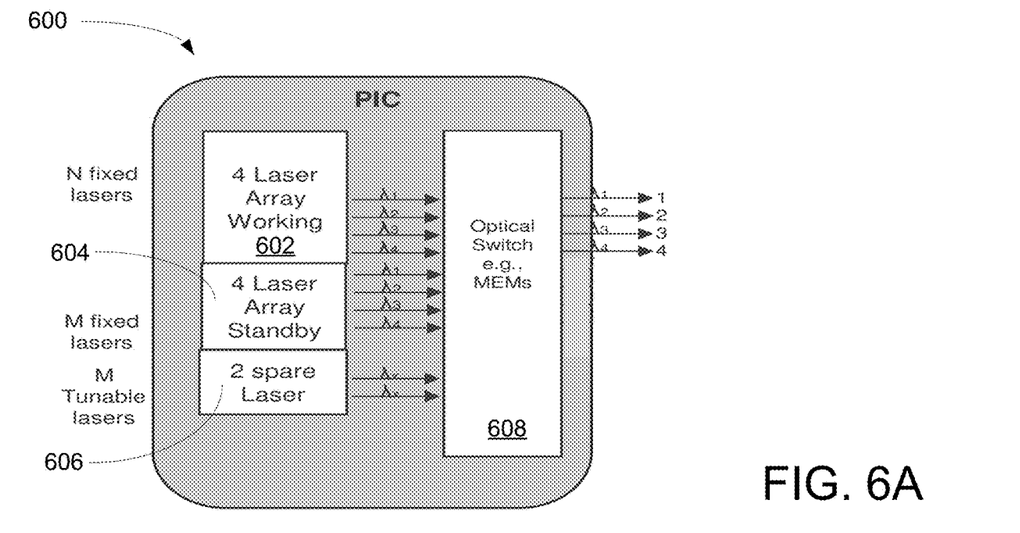
FIGS. 6A-B are block diagrams illustrating PICs having a two-layer protection in accordance with embodiments of the present invention.

FIG. 6A is a block diagram illustrating a PIC 600 having a two-layer protection in accordance with one embodiment of the present invention. PIC 600, in one embodiment, includes four (4) working lasers 602, four (4) standby lasers 604, two (2) spare lasers 606, and optical switch 608, wherein optical switch 608 can be fabricated using MEMS (micro-electro mechanical systems) technology. Note that four (4) lasers 602-604 and two (2) lasers 606 are exemplarily configurations wherein PIC 600 can have any number of working lasers 602, standby laser 604, and spare lasers 606. It should be noted that the underlying concept of the exemplary embodiment(s) of the present invention would not change if one or more blocks (or devices) were added to or removed from PIC 600.

In one embodiment, PIC 600 is one-to-one (1:1) protection plus a secondary ("$2^{nd}$") protection using spare lasers, and optical switch 608. Working laser 602 includes four (4) lasers capable of providing fixed WLs from $\lambda 1$ to $\lambda 4$ while standby lasers 604 includes four (4) lasers capable of providing fixed WLs from $\lambda 1$ to $\lambda 4$. Auxiliary laser array 606, also known as spare or protection lasers, includes two (2) tunable lasers capable of being tuned to any of WLs from $\lambda 1$ to $\lambda 4$. Optical switch 608, in one embodiment, is integrated on PIC 600 and is capable of replacing "bad" working lasers with "spare" lasers. Alternatively, whole working laser array 602 can be replaced with the standby laser array 604. In one aspect, the $2^{nd}$ spare lasers 606 are used to protect any lasers in the working array or standby array. Spare or auxiliary lasers 606 provide a $2^{nd}$ level of protection. For example, the $1^{st}$ level protection is the array protection provided by the standby array and the $2^{nd}$ level protection is provided by the spare laser. The four (4) output WLs $\lambda 1$ to $\lambda 4$ from optical switch 608 are the output WLs of PIC 600. PIC 600 can be used in "discrete" or "integrated" WDM network configurations.

An advantage of using PIC 600 is that it can help improve overall PIC manufacturing yield as well as in-field failures recovery.

Figure 6B:
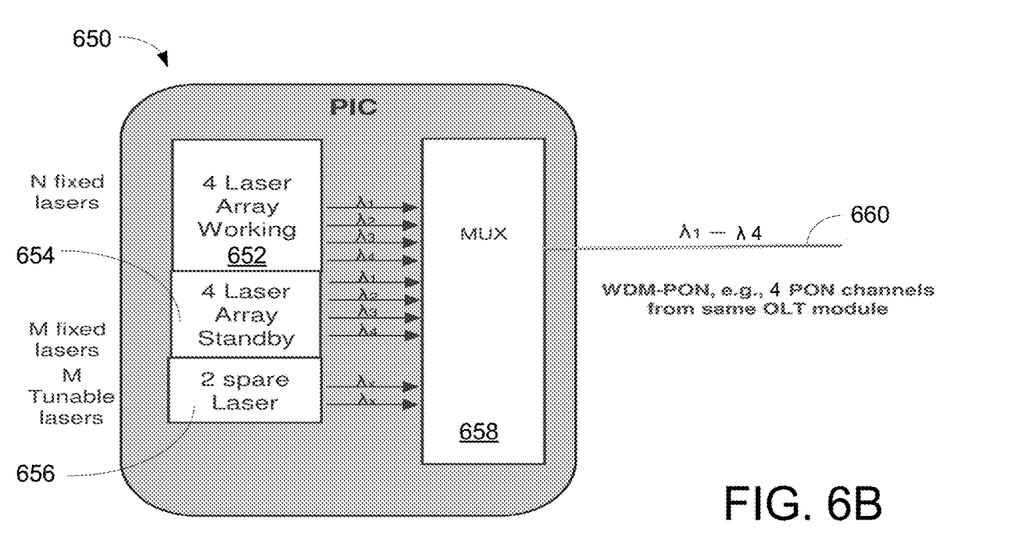

FIG. 6B is a block diagram illustrating a PIC 650 having a two-layer protection in accordance with one embodiment of the present invention. PIC 650, in one embodiment, includes four (4) working lasers 652, four (4) standby lasers 654, two (2) spare lasers 656, and optical mux 658, wherein mux 658 is in general less sophisticated than an optical switch as illustrated in FIG. 6A. Note that four (4) lasers 652-654 and two (2) lasers 656 are exemplarily configurations wherein PIC 650 can have any number of lasers 652, laser 654, and spare lasers 656. It should be noted that the underlying concept of the exemplary embodiment(s) of the present invention would not change if one or more blocks (or devices) were added to or removed from PIC 650.

In one embodiment, PIC 650 is one-to-one (1:1) protection plus a secondary ($2^{nd}$) protection using spare lasers, and optical switch 658. Working laser 652 includes four (4) lasers capable of providing fixed WLs from $\lambda 1$ to $\lambda 4$ while standby lasers 654 includes four (4) lasers capable of providing fixed WLs from $\lambda 1$ to $\lambda 4$. Auxiliary laser array 656, also known as spare or protection lasers, includes two (2) lasers capable of tuning their output WLs to any of the fixed WLs from $\lambda 1$ to $\lambda 4$. Optical mux 658, in one embodiment, is integrated in PIC 650 and is capable of replacing "bad" working lasers with "spare" lasers. Alternatively, whole working laser array 652 can be replaced by the standby laser array 654. In one aspect, the $2^{nd}$ spare lasers 656 are used to protect any lasers in the working array or standby array. Spare or auxiliary lasers 656 provide a $2^{nd}$ level of protection to PIC 650. For example, the $1^{st}$ level protection is the array protection provided by the standby array and the $2^{nd}$ level protection is provided by the spare laser. The four (4) output WLs $\lambda 1$ to $\lambda 4$ from mux 658 are multiplexed onto a single fiber 660 coupled to, for example, four (4) PON channels via WDM-PON. PIC 650 can be used in "integrated" WDM network configurations.

An advantage of using PIC 650 is that it can help improve overall PIC manufacturing yield as well as in-field failures recovery.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 7:
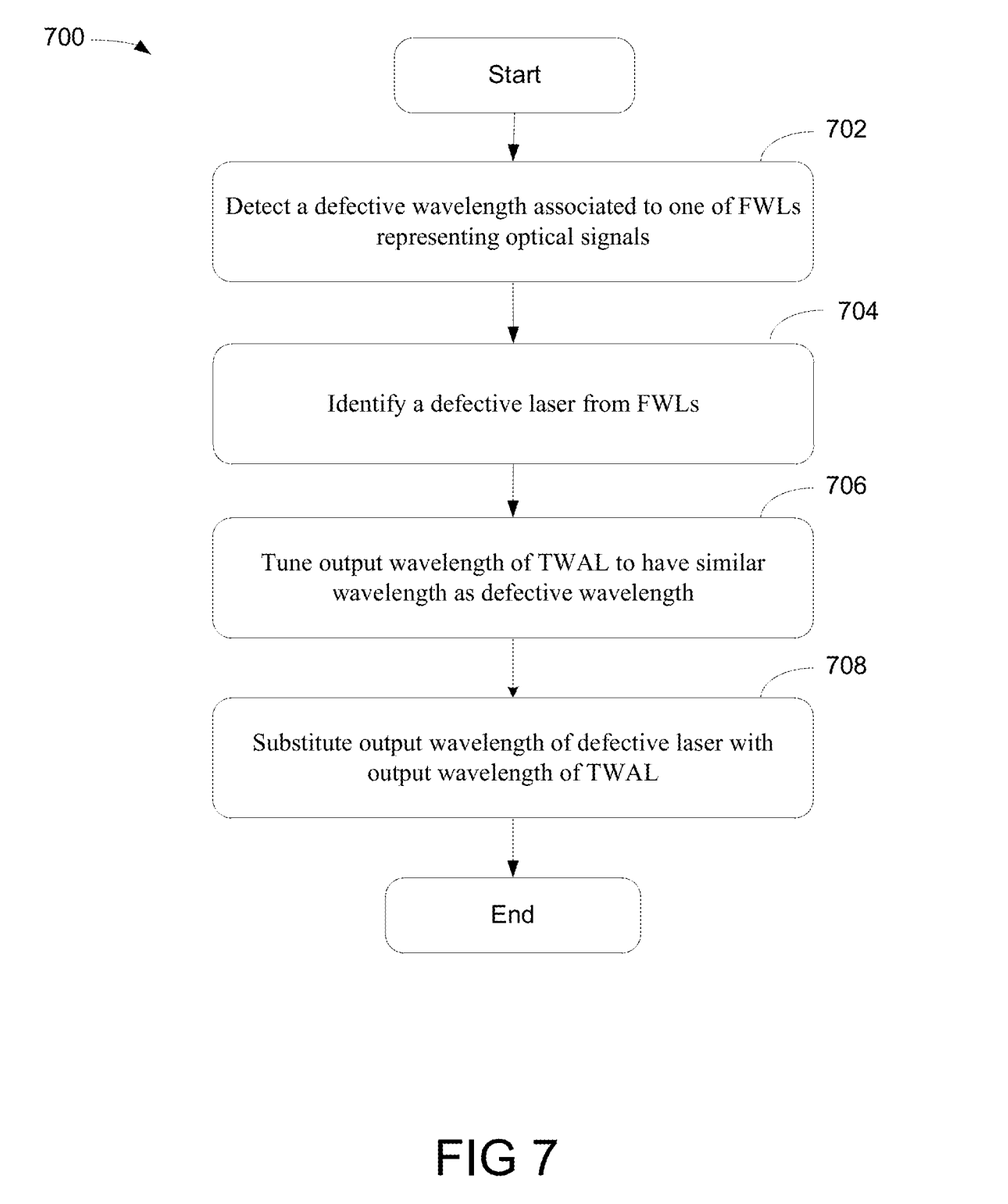
FIG. 7 is a flowchart illustrating an exemplary process of repairing defective laser(s) using prefabricated spare parts in accordance with embodiments of the present invention.

FIG. 7 is a flowchart 700 illustrating an exemplary process of repairing a defective laser(s) using prefabricated spare parts within a PIC in accordance with one embodiment of the present invention. At block 702, a process capable of replacing a defective working laser detects a failed or defective optical wavelength associated to one of the fixed-wavelength lasers ("FWLs") representing a set of optical signals. For example, after obtaining a portion of output wavelength generated by one of the FWLs, the portion of output wavelength is examined in accordance with a set of predefined functional requirements. The process issues an FWL failure when the portion of output wavelength fails to meet the set of predefined functional requirements.

At block 704, a defective laser from the FWLs is identified in accordance with the failed or defective optical wavelength. For example, the process determines the defective laser based on the unique fixed wavelength and/or frequency associated with the FWL.

At block 706, the output wavelength of a tunable-wavelength auxiliary laser ("TWAL") is tuned to produce the same or similar wavelength as the failed or defective optical wavelength. For example, if the defective laser emits a defective red light, TWAL is tuned so that TWAL will produce red light whereby the output WL of the defective laser can be replaced by the output WL of TWAL.

At block 708, the process is able to substitute the output WL of the defective laser with the output wavelength of the TWAL. In one aspect, the availability of spare lasers or standby FWLs capable of replacing working FWLs is identified. The output of the TWAL is routed to replace the output of the defective laser and the input signals originally for the defective laser are redirected to the input of TWAL.

Figure 8:
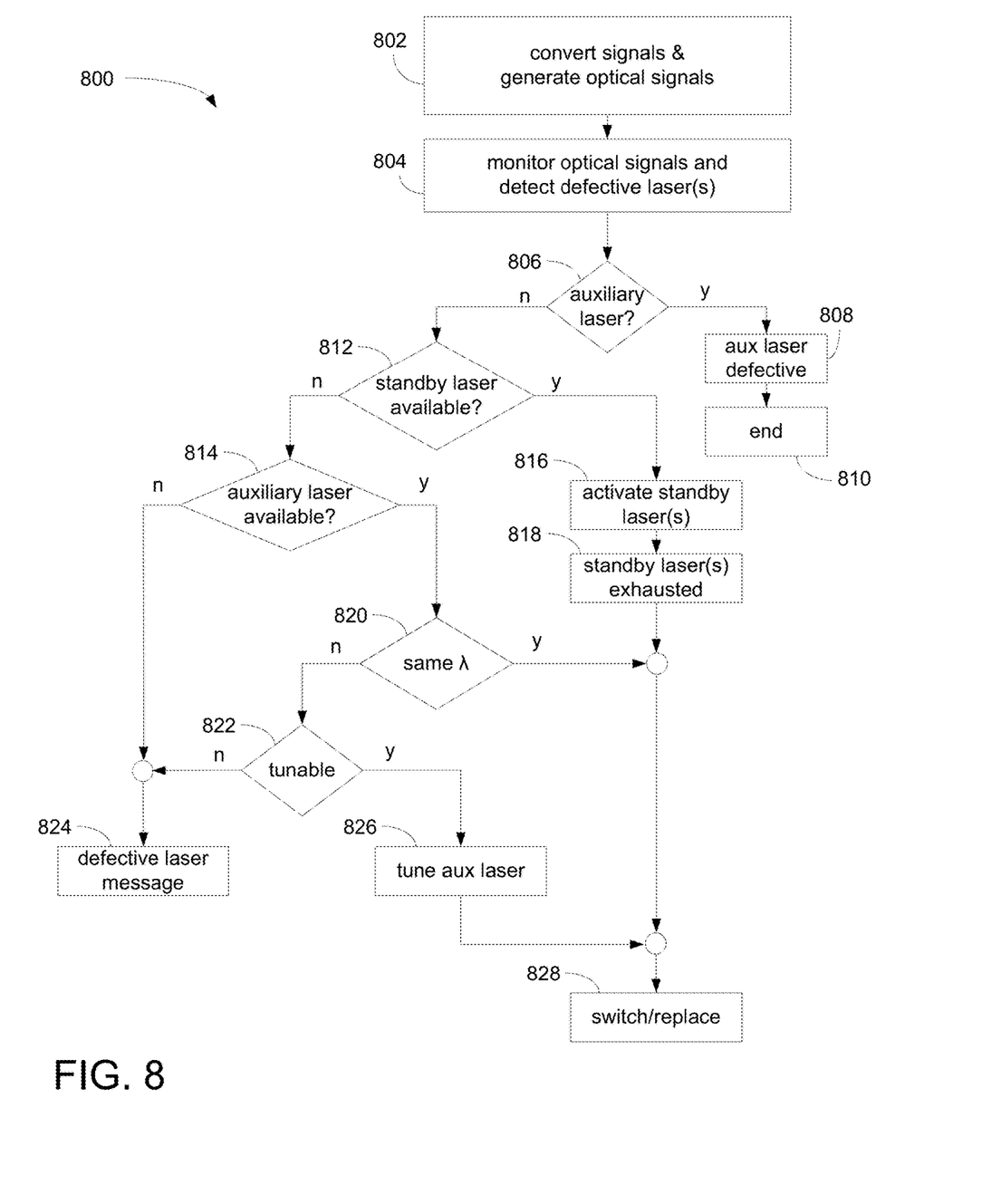
FIG. 8 is a flowchart illustrating an exemplary logic process for repairing a defective laser in accordance with one embodiment of the present invention.

FIG. 8 is a flowchart 800 illustrating an exemplary logic process for repairing a defective laser in accordance with one embodiment of the present invention. At block 802, the process generates optical signals or WLs in response to converted electrical signals. The process, at block 804, monitors optical signals, and is capable of detecting defective WLs associated to defective lasers since each WL has a unique wave shape, wave frequency, or WL form. For example, a detector uses multiple parameters to detect whether a laser is functioning. The detecting parameters include, but not limited to, laser optical power monitoring, bias current monitoring, and/or laser current draw.

At block 806, the process exams to see whether the defective laser is a last auxiliary or standby laser. If it is an auxiliary laser, the process proceeds to block 808 and marks the auxiliary laser or standby laser defective. The process ends at block 810. If the defective laser is not the last auxiliary or standby laser, the process proceeds to block 812 to exam whether standby laser(s) is available. If the standby laser is available, the process proceeds to block 816 to activate the standby laser. In one aspect, the entire working laser array which may contains one defective laser is replaced by the standby laser array at block 816. At block 818, if the standby laser array is exhausted or used up, the process issues a message indicating that the standby lasers are no longer available. At block 828, the process issues a shutdown command to offload the defective laser while at the same time replaces the standby laser array with the working laser array. If the standby laser(s) is tunable, the standby laser is tuned to the failed laser wavelength/channel before the standby laser can be used for substitution. The standby laser(s) is subsequently brought online.

If the standby laser is not available at block 812, the process proceeds to block 814 to exam whether auxiliary or spare lasers are available. If the auxiliary lasers are not available, the process proceeds to block 824 and a message of defective laser is broadcasted. If auxiliary lasers are available, the process proceeds to block 820 to exam whether the auxiliary laser has the same WL as the defective WL generated by the defective laser. If they have the same WLs, the process proceeds to block 828 to replace the defective laser by the auxiliary laser.

If the output WL of auxiliary laser is different from the output WL of defective laser at block 820, the process proceeds to block 822 to identify whether the auxiliary laser(s) is tunable. If the auxiliary laser(s) is not tunable, the process proceeds to block 824 to indicate that the defect cannot be repaired. If, at block 822, the auxiliary laser is tunable, the process proceeds to block 826 to tune the auxiliary output WL so that the output WL of auxiliary laser will be the same as output WL of the defective laser. After the auxiliary laser is properly turned or adjusted, the process proceeds to block 828 to shut down the defective laser while bring the auxiliary or spare laser online.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. An optical device operable to emit optical signals, comprising:
    a group of lasers configured to generate a set of unique optical wavelengths representing a set of optical signals, each of the group of lasers configured to generate a fixed wavelength;
    a group of standby lasers configured to generate a set of unique optical wavelengths and capable of being optionally activated to substitute one or more defective lasers in the group of lasers;
    a group of auxiliary tunable lasers coupled to the group of lasers and operable to replace at least one defective laser in the group of lasers;
    a plurality of monitoring elements coupled to the groups of lasers and configured to detect a defective wavelength generated from one of standby lasers and an auxiliary tunable laser; and
    a tuner coupled to the group of auxiliary tunable lasers and configured to facilitate replacing a defective laser in the group of lasers with an auxiliary tunable laser in the group of auxiliary tunable lasers when the auxiliary tunable laser is adjusted to the defective wavelength.

2. The device of claim 1, further comprising an optical switch coupled to the group of lasers and configured to switch between output of the group of lasers and outputs of the group of standby lasers.

3. The device of claim 2, wherein the optical switch is configured to switch between the output of the group of lasers and outputs of the group of auxiliary tunable lasers.

4. The device of claim 1, wherein the group of lasers generate a set of different wavelengths representing a set of data stream.

5. The device of claim 1, wherein the group of standby lasers generate a set of different wavelengths and are able to substitute the group of lasers.

6. The device of claim 1, wherein the group of auxiliary tunable lasers are operable to adjust their output wavelengths to match with anyone of the set of different wavelengths.

7. The device of claim 1, further comprising a photonic detector coupled to the group of lasers and configured to detect wavelength defects associate with the group of lasers.

8. The device of claim 1, wherein the plurality of monitoring elements are capable of detecting a defective wavelength associate with one of the group of lasers.

9. A photonic integrated circuit ("PIC") operable to transmit and receive optical signals, comprising:
    a laser array capable of generating a plurality of optical signals, wherein the laser array includes a set of fixed-wavelength lasers ("FWLs") configured to generate a first set of optical wavelengths representing the plurality of optical signals;
    a standby laser array coupled to the laser array and capable of being optionally activated to replace one or more defective FWLs in the laser array when one or more defective wavelengths are detected;
    a spare laser array coupled to the laser array and configured to include at least one tunable-wavelength auxiliary laser ("TWAL") configured to generate an optical signal having a wavelength based on a wavelength setting signal;
    an optical switch coupled to the laser array and capable of replacing a defective FWL in the laser array with a TWAL in the spare laser array after output wavelength of the TWAL is adjusted in response to the defective wavelength produced by the defective FWL;

a plurality of monitoring elements configured to detect a defective wavelength generated from one of FWL in the standby laser array and the TWAL in the spare laser array; and one or more tuners configured to turn the output wavelength of a TWAL in response to the defective wavelength.

10. The device of claim 9, wherein the optical switch is capable of replacing defective FWLs with FWLs in the standby laser array after the defective at least one defective wavelength is detected.

11. The device of claim 9, wherein the plurality of monitoring elements is capable of detecting one or more defective wavelengths associate to one or more FWLs in the laser array.

12. The device of claim 9, wherein each of the first set of optical wavelengths is directed to one of the plurality of monitoring elements for monitoring and detecting any defective wavelengths associate with one of the FWLs in the laser array.

13. The device of claim 9, wherein the optical switch is operable to logically switch off a defective laser in response to a defective signal from the detector.

14. The device of claim 9, wherein the optical switch includes an optical shuffle able to generate multiple output wavelengths from the FWLs and the TWAL discretely.

15. The device of claim 9, wherein the standby laser array further includes a second set of FWLs configured to generate a second set of optical wavelengths optionally activated to replace one or more defective FWLs in the laser array.

16. A method of replacing a defective laser in a photonic integrated circuit ("PIC") having a laser array, a standby laser array, and a spare laser array, comprising:

detecting, by an optical diode, a defective wavelength associated to a defective laser;

activating a standby laser in the standby laser array to replace the defective laser if the defective laser is not an auxiliary laser in the spare laser array;

tuning, by a tuner, output wavelength of a tunable-wavelength auxiliary laser ("TWAL") in the spare laser array to have similar wavelength as the defective wavelength when the standby laser is not available; and replacing, by the optical switch, output wavelength of the defective laser in the laser array with the output wavelength of the TWAL in the spare array.

17. The method of claim 16, further comprising identifying availability of standby fixed-wavelength lasers ("FWLs") capable of replacing FWLs.

18. The method of claim 16, wherein detecting a failed optical wavelength includes obtaining a portion of output wavelength generated by one of a first plurality of FWLs; and examining the portion of output wavelength in accordance with a set of predefined minimal functional requirements.

* * * * *